United States Patent
Sardesai

(12) 
(10) Patent No.: US 6,542,275 B1
(45) Date of Patent: Apr. 1, 2003

(54) DISPERSION COMPENSATING ELEMENT HAVING SUBSTANTIALLY UNIFORM SPECTRAL NONLINEARITY

(75) Inventor: Harshad P. Sardesai, Elkridge, MD (US)

(73) Assignee: Ciena Corporation

( * ) Notice: Subject to any disclaimer, the term of this patent is extended or adjusted under 35 U.S.C. 154(b) by 0 days.

(21) Appl. No.: 09/107,204

(22) Filed: Jun. 29, 1998

(51) Int. Cl.[7] .......................... H04B 10/12; H04J 14/02
(52) U.S. Cl. ..................... 359/161; 359/173; 359/124; 359/127
(58) Field of Search ................. 359/124–134, 359/161, 173

(56) References Cited

U.S. PATENT DOCUMENTS

| | | | | |
|---|---|---|---|---|
| 5,224,183 A | * | 6/1993 | Dugan | 359/161 |
| 5,524,144 A | | 6/1996 | Suzuki | 359/176 |
| 5,532,868 A | * | 7/1996 | Gnauck et al. | 359/332 |
| 5,602,666 A | * | 2/1997 | Ishikawa et al. | 359/161 |
| 5,781,673 A | * | 7/1998 | Reed et al. | 359/159 |
| 5,877,879 A | * | 3/1999 | Naito | 359/133 |
| 5,905,825 A | * | 5/1999 | Brindel et al. | 385/24 |
| 5,920,588 A | * | 7/1999 | Watanabe | 372/96 |
| 5,959,750 A | * | 9/1999 | Eskildsen et al. | 359/134 |
| 5,963,361 A | * | 10/1999 | Taylor et al. | 359/337 |
| 6,043,914 A | * | 3/2000 | Cook et al. | 359/124 |
| 6,055,081 A | * | 4/2000 | Koyano et al. | 359/130 |
| 6,081,360 A | * | 6/2000 | Ishikawa | 359/161 |
| 6,137,604 A | * | 10/2000 | Bergano | 359/124 |
| 6,154,588 A | * | 11/2000 | Kai | 359/161 |

FOREIGN PATENT DOCUMENTS

| | | |
|---|---|---|
| GB | 2299473 | 10/1996 |
| GB | 2309131 | * 7/1997 |
| WO | 97/37446 | * 10/1997 |

OTHER PUBLICATIONS

Agrawal, "Nonlinear Fiber Optics" 2n Edition, pp. 16, 17, and 36–43, Academic Press 1995.

Yamauchi, "Fiber Nonlinearity: Measurements and Countermeasures", OFC'95.

Marhic, M.E., et al.; "Optimizing the Location of Dispersion Compensators in Periodically Amplified Fiber Links in the Presence of Third–Order NonLinear Effects"; IEEE Photonics Technology Letters, vol. 8, No. 1, pp. 145–147, (1996).

* cited by examiner

Primary Examiner—Leslie Pascal
(74) Attorney, Agent, or Firm—David L. Soltz

(57) ABSTRACT

A dispersion compensating element having a substantially uniform spectral nonlinearity is described. The dispersion compensating unit is thus suitable for incorporation into high speed wavelength division multiplexed (WDM) optical communication systems. Several examples of dispersion compensating elements are discussed, each of which comprising at least one segment of dispersion compensating fiber.

12 Claims, 9 Drawing Sheets

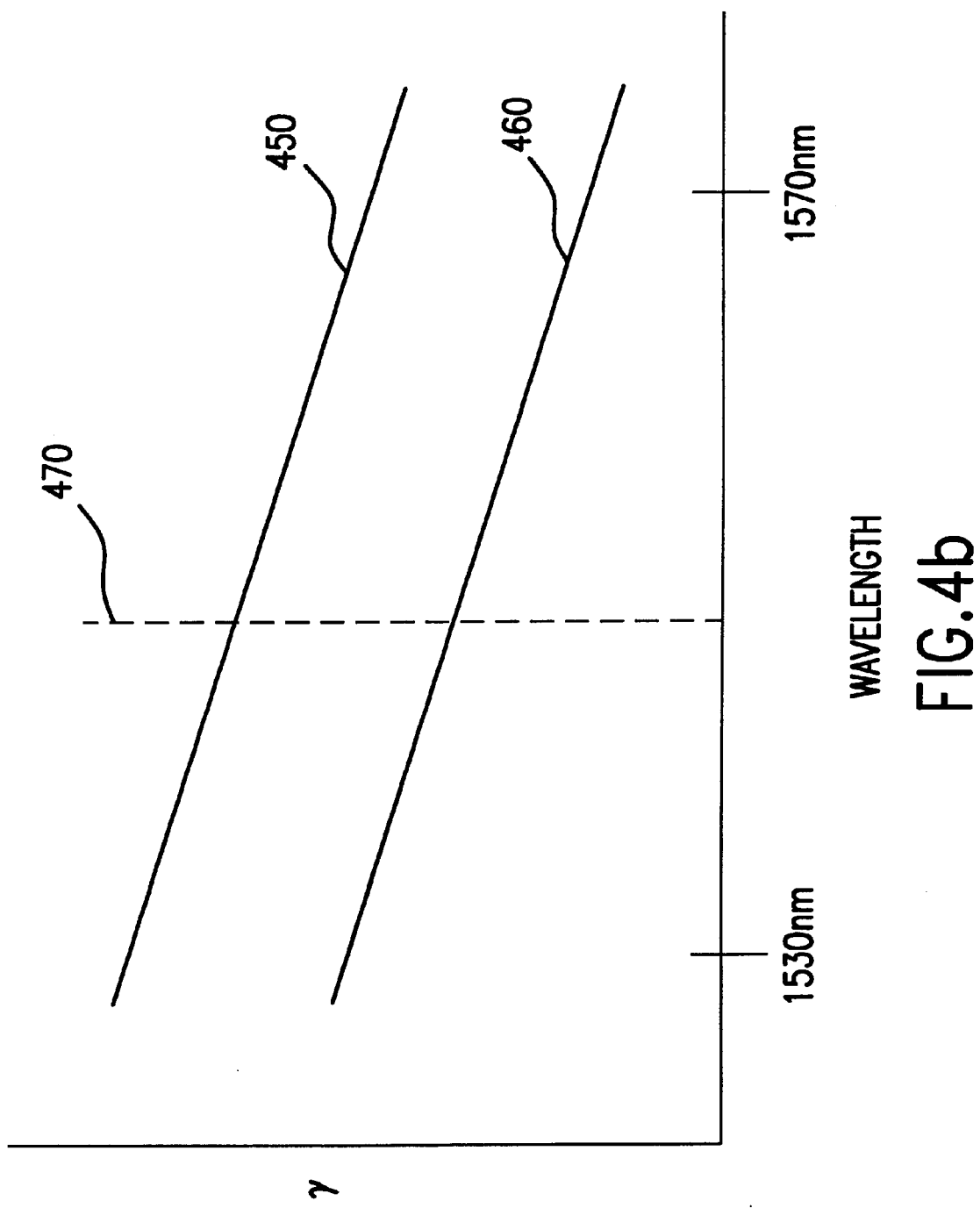

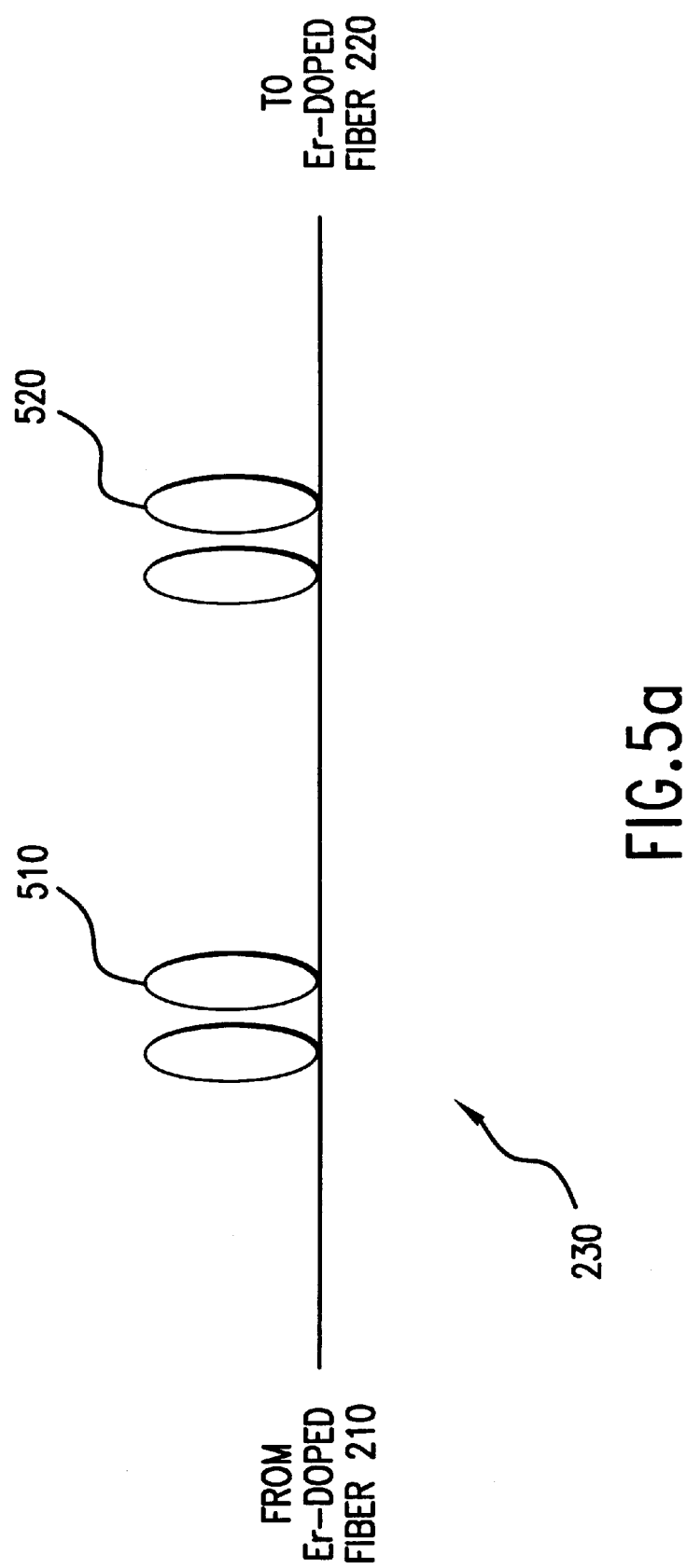

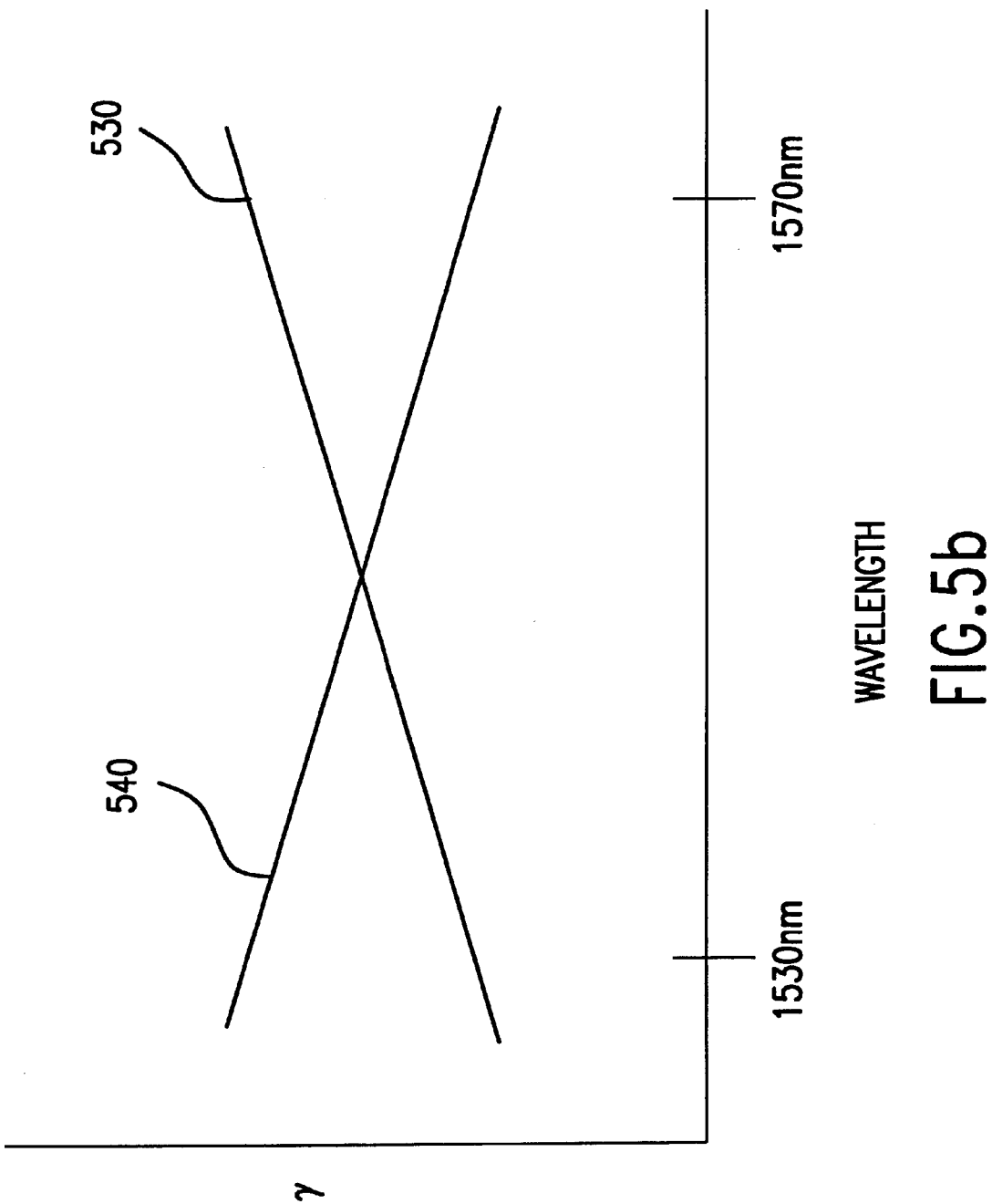

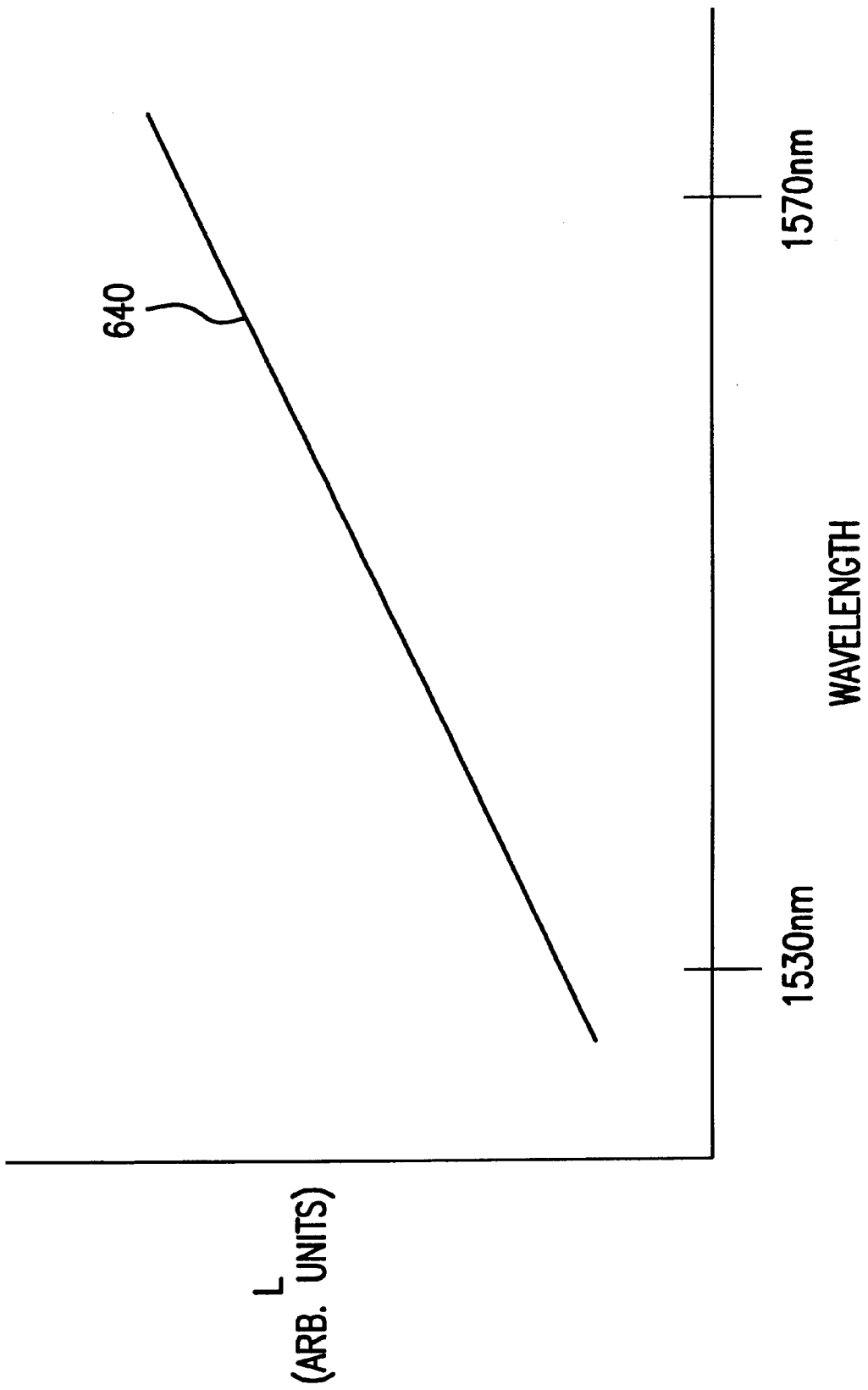

DISPERSION COMPENSATING ELEMENT HAVING SUBSTANTIALLY UNIFORM SPECTRAL NONLINEARITY

The present invention is directed toward a wavelength division multiplexed communication system having a dispersion compensation element that provides spectrally uniform nonlinearity behavior.

BACKGROUND OF THE INVENTION

Optical signals transmitted in a fiber optic communication system typically constitute a series of pulses of digital information. Although the pulses are usually at a single nominal wavelength, each pulse is actually composed different spectral components. These spectral components propagate through the transmission fiber at different speeds with higher frequency components traveling slower than lower frequency components. This effect, known as "chromatic dispersion", can result in spectral components of one pulse arriving at a receiver at substantially the same time as a succeeding pulse, thereby causing degraded receiver sensitivity. Chromatic dispersion becomes increasingly pronounced at higher bit rates, e.g. those associated with synchronous optical network (SONET) OC-192 transmission speeds.

Dispersion compensated fiber, commercially available from Corning, for example, can be used to offset chromatic dispersion. It is known, however, that dispersion compensated fiber has a nonlinearity coefficient γ, which is related to a nonlinearity property of the refractive index of the fiber, $n_2$, and the mode field diameter, otherwise referred to as the fiber effective area $A_{\mathit{eff}}$ (see Agrawal, "Nonlinear Fiber Optics", Academic Press, Inc., 1995, pp. 37–43). In particular, γ can be expressed as follows:

$$\gamma = \frac{2\pi n_2}{\lambda A_{\mathit{eff}}}$$

In general, $n_2$ depends on the fiber composition and dopants, e.g., fluoride doped fibers have a different $n_2$ value than germanium doped fibers. $A_{\mathit{eff}}$, however, is related to fiber geometry, doping profile and waveguiding characteristics. For single wavelength transmission applications, $n_2$ and $A_{\mathit{eff}}$ have fixed values associated with the transmission wavelength λ.

Recently, wavelength division multiplexing (WDM) has been explored as an approach for increasing the capacity of existing fiber optic networks. In a WDM system, plural optical signal channels are carried over a single optical fiber with each channel being assigned a particular wavelength. The wavelengths are typically within a narrow range about 1550 nm, the absorption minimum of silica fiber. At high data speeds, such as OC-192 rates, the dispersion associated with each channel must be compensated. Moreover, the nonlinearity coefficient γ for each channel should be substantially the same, i.e., γ should be spectrally uniform. Otherwise, some channels may have more errors than others, thereby degrading system performance.

SUMMARY OF THE INVENTION

The nonlinearity coefficient γ of dispersion compensated fiber has been assumed to be spectrally uniform over a relatively broad range of optical wavelengths. It has been found, however, that γ can vary substantially over a relatively narrow wavelength range of wavelengths. In particular, for wavelengths within a narrow range about 1550 nm, $n_2/A_{\mathit{eff}}$ values of dispersion compensated fiber as high as $1.7 \times 10^{-9}$ (1/W) (at about 1543 nm) and as low as low as $1.2 \times 10^{-9}$ (1/W) (at about 1557 nm) have been measured. Accordingly, in WDM systems in which optical signals carry high-speed data at these wavelengths, selected channels can have a 40% higher γ than other channels. As a result, the higher γ channels may exhibit different system performance as characterized by different error rates. Accordingly, system design is made difficult.

Accordingly, the present invention provides a WDM optical communication apparatus comprising a dispersion compensating element having at least one dispersion compensating fiber. The dispersion compensating element is configured to mitigate the effects of a spectrally nonuniform nonlinearity coefficient behavior of the fiber, thereby giving an effectively uniform nonlinearity behavior for the plural optical signals in a WDM system.

BRIEF DESCRIPTION OF THE DRAWINGS

Advantages of the present invention will be apparent from the following detailed description of the presently preferred embodiments thereof, which description should be considered in conjunction with the accompanying drawings in which:

FIG. 4b illustrates plots of nonlinearity coefficient γ vs. wavelength for the segments of dispersion compensated fiber shown in FIG. 4a;

FIG. 5a illustrates a dispersion compensating element in accordance with a further embodiment of the present invention comprising segments of dispersion compensated;

FIG. 5b illustrates plots of nonlinearity coefficient γ as a function of wavelength for the segments of dispersion compensated fiber shown in FIG. 5a;

FIG. 6b illustrates a plot of dispersion compensating fiber length L as a function of wavelength for a given nonlinearity coefficient γ.

DETAILED DESCRIPTION

Figure 1:
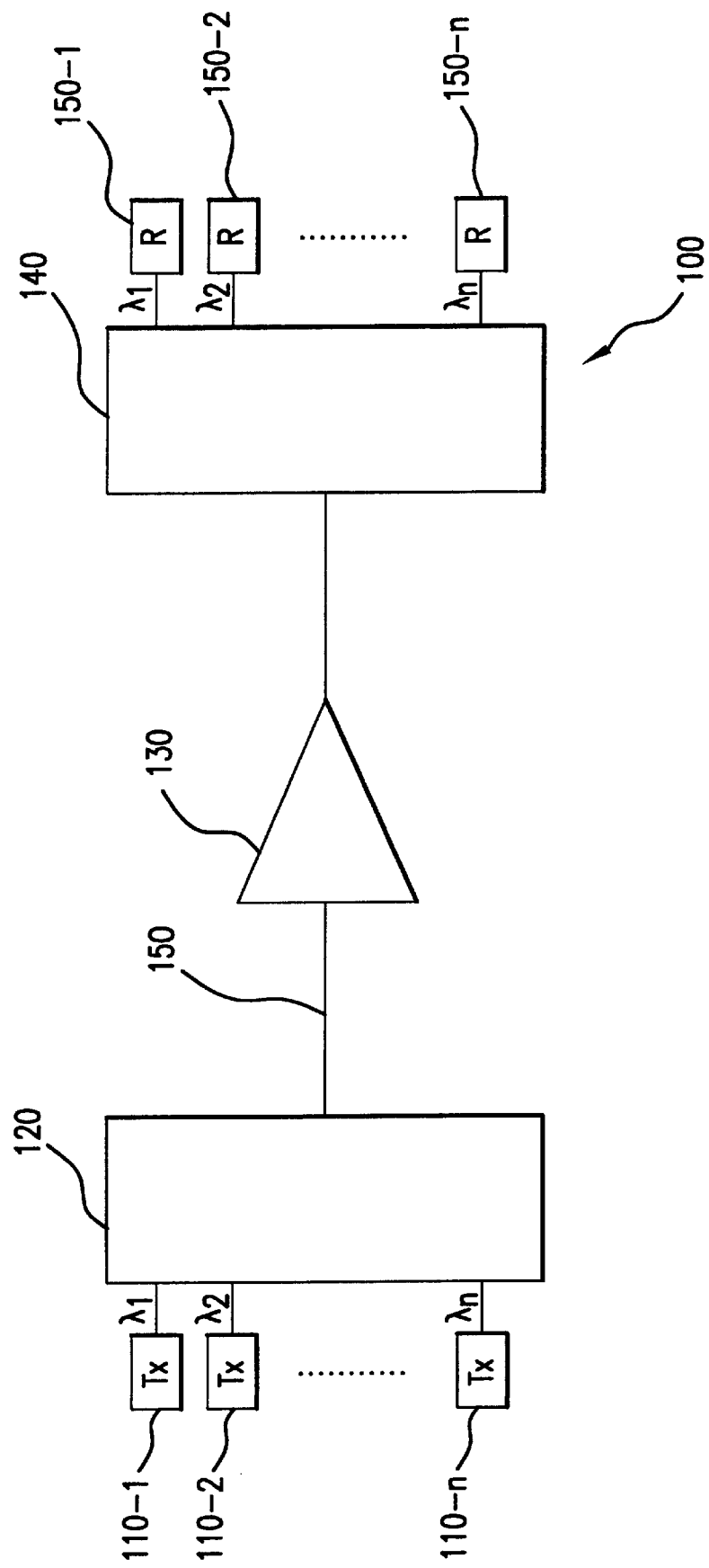
FIG. 1 illustrates a functional block diagram of an optical communication system comprising an optical amplifier in accordance with a feature of the present invention.

Turning to the drawings in which like reference characters indicate the same or similar elements in each of the several views, FIG. 1 illustrates a WDM communication system 100 in accordance with a feature of the present invention. WDM communication system 100 comprises a plurality of optical transmitters 110-1 to 110-n, each including a directly or externally modulated laser and outputting optical signals at a respective one of wavelengths $\lambda_1$ to $\lambda_n$. The optical signals are fed to combiner 120, described, for example, in U.S. Pat. No. 5,504,609 incorporated by reference herein, for supplying the optical signals to an optical communication path 150 including an optical fiber. In order to compensate for optical fiber loss, one or more optical amplifiers 130 can be provided along optical communication path 150 for amplifying the optical signals. The optical signals are next input to optical demultiplexer 140, comprising, for example, an arrayed waveguide grating or in-fiber Bragg gratings, for separating the optical signals based on wavelength. Each optical signal wavelength is supplied to a corresponding one of receivers 150-1 to 150-n. Receivers 150-1 to 150-n each include a photodetector for generating electrical signals for further transmission and/or processing.

Figure 2:
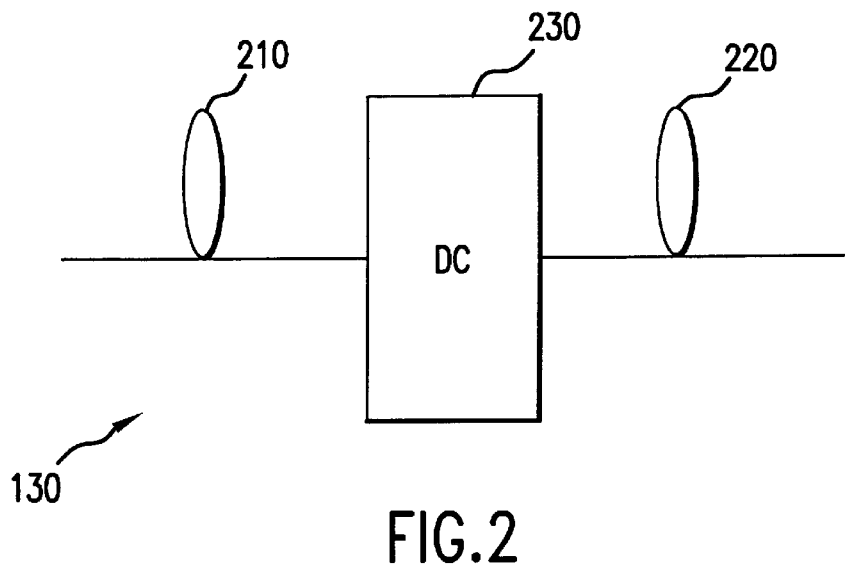
FIG. 2 illustrates the optical amplifier shown in FIG. 1 in greater detail.

Optical amplifier 130 is shown in greater detail in FIG. 2. Optical amplifier 130 includes first and second segments of erbium-doped optical fiber 210 and 220, each of which being pumped with a known laser source operating at 980 nm and/or 1480 nm to provide appropriate gain. Optical amplifier 130 further comprises a dispersion compensating element 230 having a substantially uniform spectral nonlinearity coefficient $\gamma$. As a result, each optical signal has substantially the same error rate, thereby improving system performance and simplifying system design.

Figure 3A:
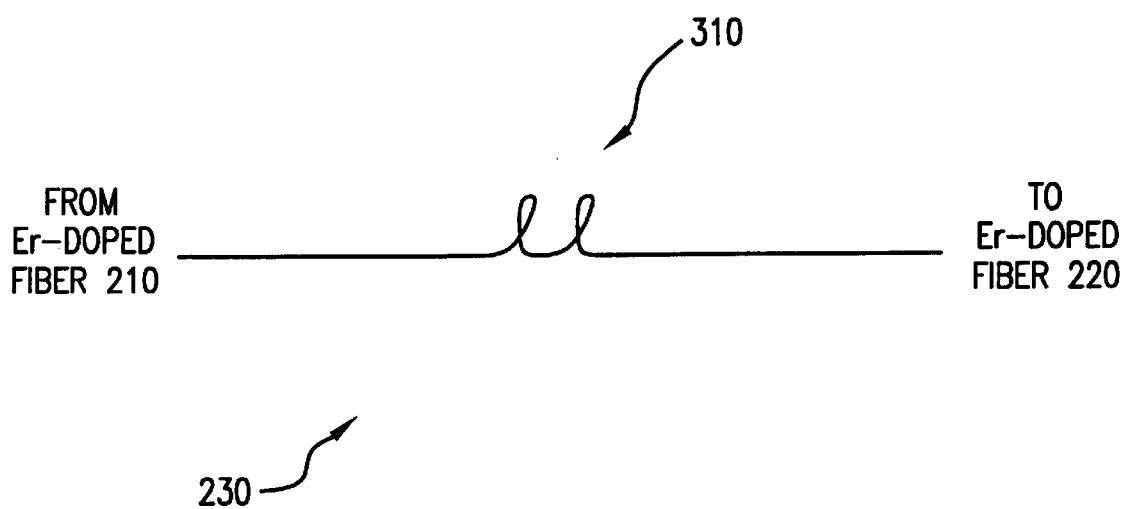
FIG. 3a illustrates a dispersion compensating element in accordance with an embodiment of the present invention.
Figure 3B:
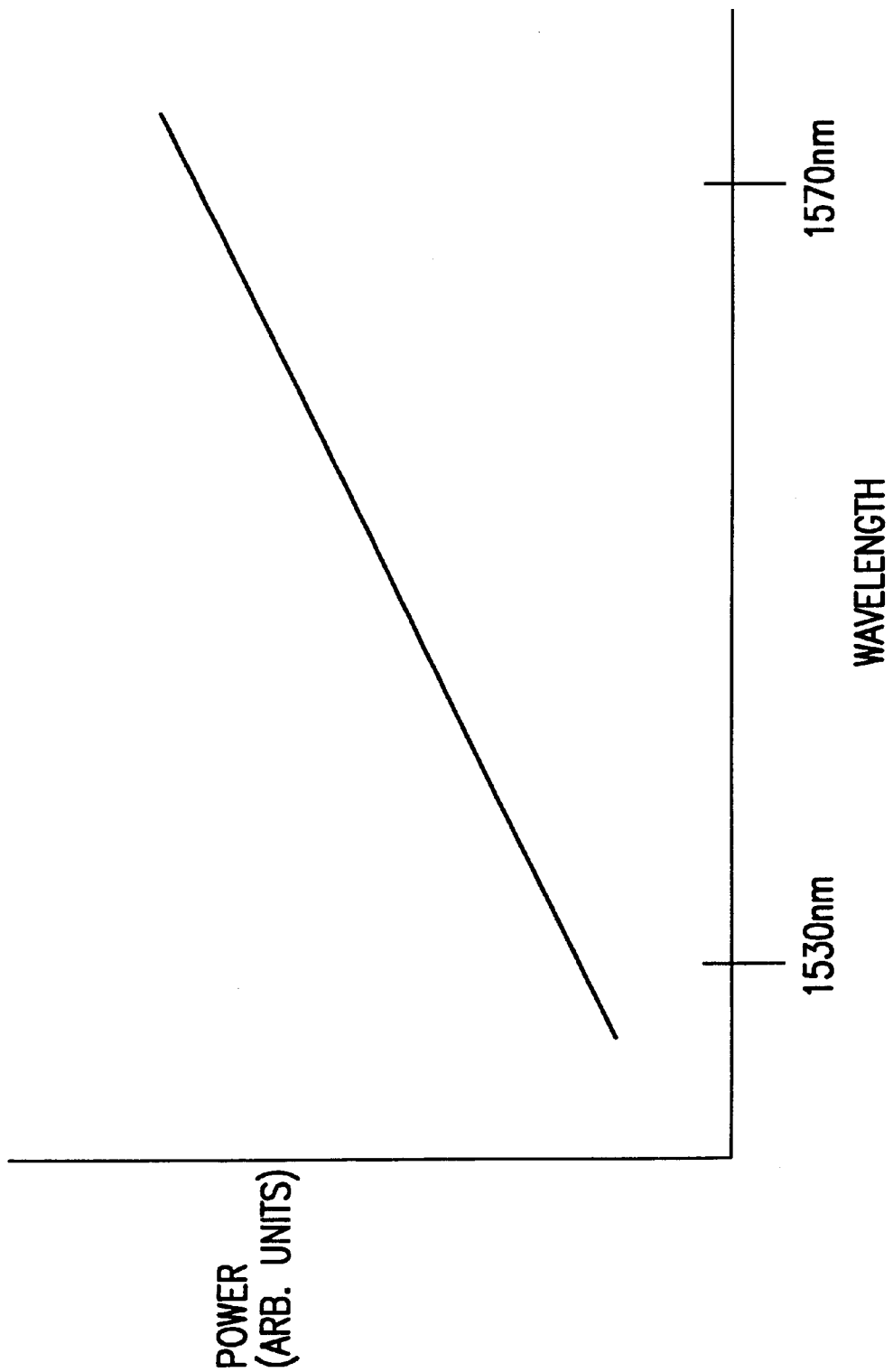
FIG. 3b illustrates a plot of power vs. wavelength for a dispersion compensating element with spectrally nonuniform γ resulting in spectrally uniform nonlinearity behavior.

FIG. 3a illustrates a first example of dispersion compensating element 130 comprising a single dispersion compensating fiber 310. Dispersion compensating fiber 310 is constructed in a known manner to have an optical power vs. wavelength characteristic shown in FIG. 3b. In this case, the effective nonlinearity experienced by signals propagating in the dispersion compensating element 310 at relatively low wavelengths and power levels is substantially the same as the effective nonlinearity at higher wavelengths and power levels. Accordingly, in this example, lower wavelength transmitters shown in FIG. 1 should output at lower power levels than high wavelength transmitters in order to obtain a spectrally uniform nonlinearity.

Figure 4A:
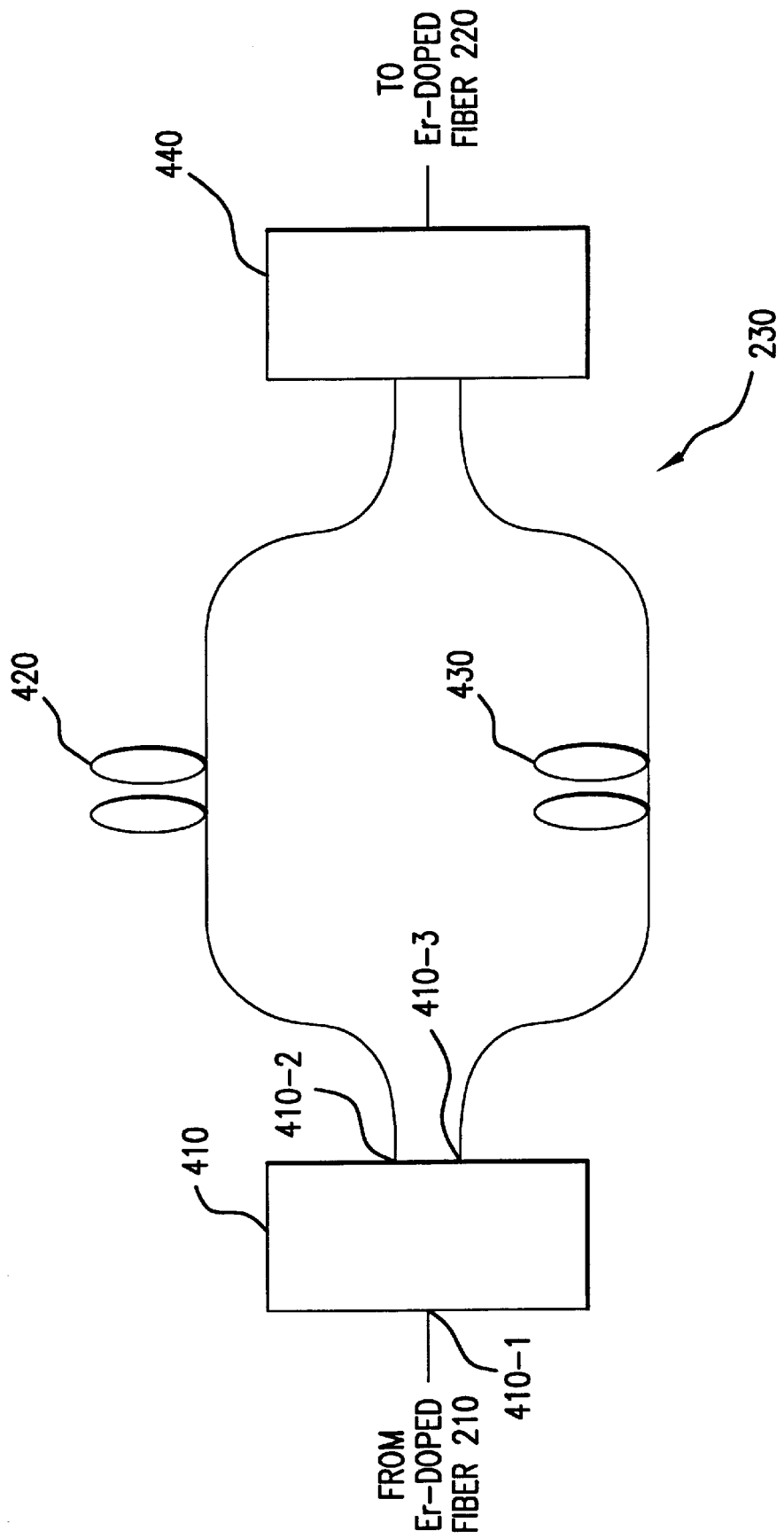
FIG. 4a illustrates a dispersion compensating element in accordance with an additional embodiment of the present invention comprising segments of dispersion compensated fiber.

A second example of dispersion compensating element 230 will next be described with reference to FIGS. 4a and 4b. As seen in FIG. 4a, dispersion compensating element 230 in this example includes an optical demultiplexer 410, such as a dielectric filter element, having an input port 410-1 that receives the optical signals from erbium-doped fiber segment 210 and outputs higher wavelength optical signals to dispersion compensating fiber 420 via port 410-2. Optical demultiplexer 410 further outputs lower wavelength optical signals via output port 410-3 to dispersion compensating fiber 430. Both dispersion compensating fibers 420 and 430 serve to offset chromatic dispersion present in the transmitted optical signals. After propagating through fibers 420 and 430, the optical signals are combined by optical combiner 440 and output to erbium-doped fiber segment 220.

Moreover, as shown in FIG. 4b, dispersion compensating fiber 420 has a $\gamma$ vs. wavelength curve 450, while dispersion compensating fiber 430 has a $\gamma$ vs. wavelength curve 460. Typically, optical signals having wavelengths to the right of dashed line 470 in FIG. 4b, i.e., the higher wavelength optical signals, are supplied to dispersion compensating fiber 420. Accordingly, these optical signals having corresponding $\gamma$ values on the lower portion of curve 450. On the other hand, optical signals having wavelengths to the left of dashed line 470, the lower wavelength optical signals, are fed to dispersion compensating fiber 430. As a result, these optical signals have $\gamma$ values lying on the upper portion of curve 460 which are substantially the same as the higher wavelength $\gamma$ values of curve 450. Thus, both higher and lower wavelength optical signals have substantially the same $\gamma$, and substantially uniform nonlinearity can be achieved over a range of wavelengths.

In accordance with a third example, dispersion compensating element 230 includes first and second dispersion compensating fibers 510 and 520 shown in FIG. 5a. Both fibers effectively offset chromatic dispersion present in the optical signals. However, dispersion compensating fiber 510 is fabricated in a known manner to have a $\gamma$ vs. wavelength characteristic represented by curve 540 in FIG. 5b, while fiber 520 has a characteristic corresponding to curve 530 having a slope opposite of curve 540. Since fibers 510 and 520 typically have equal length, the nonlinearity coefficients of the two fibers effectively cancel each other, so that the net $\gamma$ of element 230 is substantially uniform over the range of wavelengths input to dispersion compensating element 230, thereby providing spectrally uniform nonlinearity behavior.

Figure 6A:
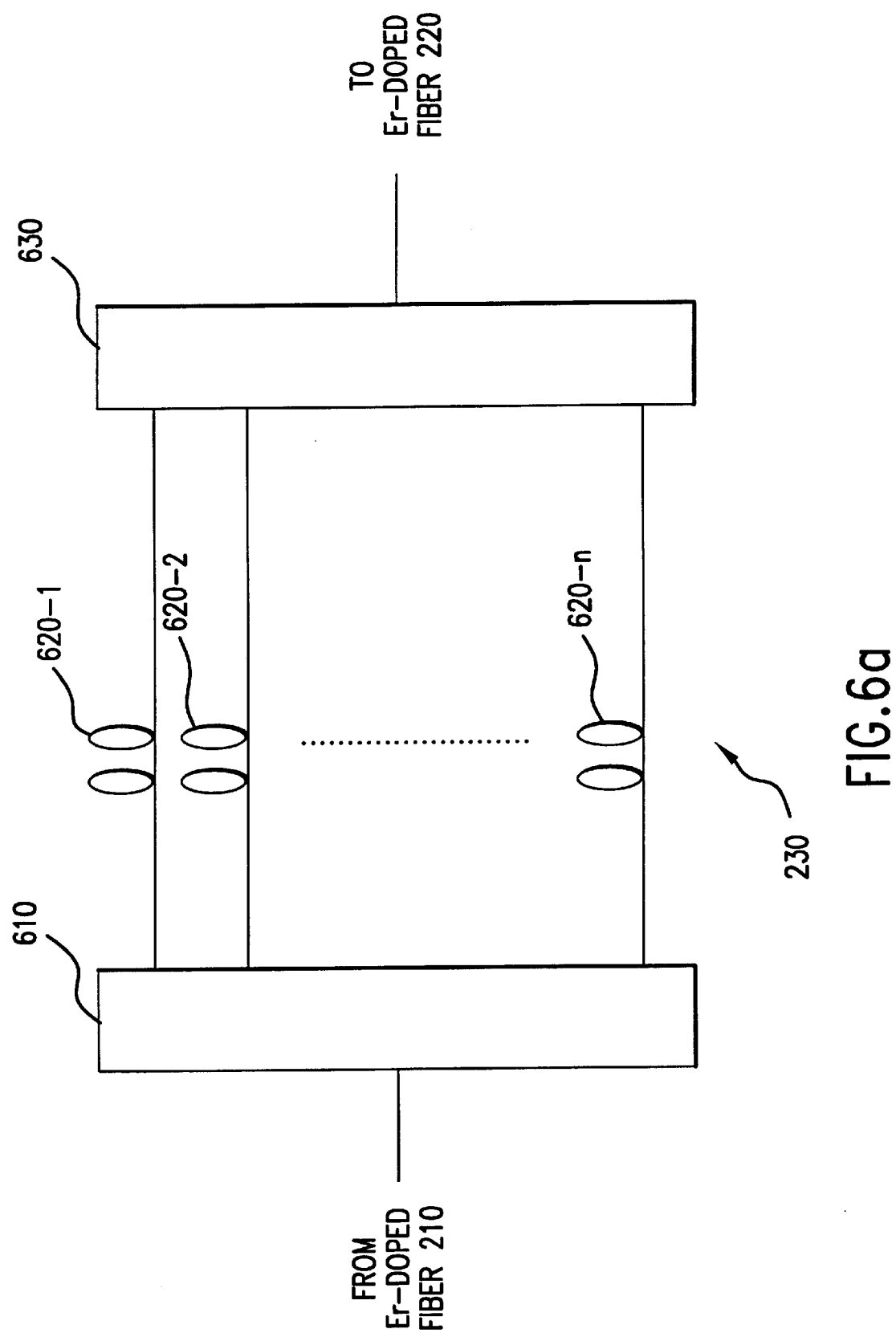
FIG. 6a illustrates a dispersion compensating element in accordance with an additional embodiment of the present invention.

In a fourth example shown in FIG. 6a, optical signals output from erbium-doped segment 210 are supplied to an optical demultiplexer 610, separated, and supplied to a respective one of dispersion compensated fibers 620-1 to 620-n. Each of these fibers has a particular length associated with a wavelength output from demultiplexer 610, and is configured to effectively offset chromatic dispersion present in a corresponding one of the optical signals. The lengths are chosen so that each of fibers 620-1 to 620-n experience substantially the same nonlinearity. In particular, the lengths are adjusted in accordance with plot 640 shown in FIG. 6b, which illustrates dispersion compensating fiber lengths L vs. wavelength. As seen in FIG. 6b, lower wavelength optical signals propagating through shorter lengths L of dispersion compensating fiber experience substantially the same nonlinearity as higher wavelength optical signals transmitted through longer sections of dispersion compensating fiber. Thus, by providing longer length dispersion compensating fibers for longer wavelengths and shorter length fiber for shorter wavelengths, substantially uniform spectral nonlinearity behavior can be obtained. As further shown in FIG. 6a, each optical signal, having substantially the same effective nonlinearity, is passed to an optical combiner 630 and output to erbium-doped fiber segment 220.

While the foregoing invention has been described in terms of the embodiments discussed above, numerous variations are possible. Accordingly, modifications and changes such as those suggested above, but not limited thereto, are considered to be within the scope of the following claims. For example, in the above examples, the dispersion compensating element is provided within an optical amplifier. It is noted, however, that the dispersion compensating element can be provided at any location within an optical communication system suitable for performing dispersion compensation.

What is claimed is:

1. An optical communication apparatus, comprising:
    a plurality of optical transmitters, each of which emitting a respective one of a plurality of optical signals, each optical signal being at a respective one of a plurality of wavelengths, each of said plurality of optical transmitters being configured to be coupled to an optical communication path, whereby said plurality of optical signals are supplied to said optical communication path;
    a dispersion compensating element configured to be coupled to said optical communication path, said dispersion compensating element comprising at least one dispersion compensating fiber and compensating a chromatic dispersion for each of said plurality of optical signal, said dispersion compensating element further having substantially uniform spectral nonlinearity; and a plurality of optical receivers configured to be coupled to said optical communication path, each of said plurality of optical receivers sensing a respective one of said plurality of optical signals.

2. An optical communication apparatus in accordance with claim 1, wherein said dispersion compensating comprises:

an optical demultiplexer having an input port and first and second output ports, said optical demultiplexer receiving said plurality of optical signals through said input port, and outputting a first group of said plurality of optical signals through said first output port, each of said first group of optical signals being at a respective one of a first group of said plurality of wavelengths, said optical demultiplexer further outputting a second group of said plurality of optical signals through said second port, each of said second group of said plurality of optical signals being at a respective one of a second group of said plurality of wavelengths, and said at least one dispersion compensating fiber is coupled to said first output port, said at least one dispersion compensating fiber having first nonlinearity coefficient values associated with said first group of said plurality of wavelengths; and an additional dispersion compensating fiber coupled to said second output port, said additional dispersion compensating fiber having second nonlinearity coefficient values associated with said second group of said plurality of wavelengths, said first and second nonlinearity coefficient values being substantially equal.

3. An optical communication apparatus in accordance with claim 2, wherein said first group of said plurality of wavelengths has associated wavelength values less than said second group of said plurality of wavelengths.

4. An optical communication apparatus in accordance with claim 2, wherein said optical communication path is a first optical communication path, said dispersion compensating element further comprising an optical multiplexer having first and second input ports and an output port, said first input port of said optical multiplexer being coupled to said at least one dispersion compensating fiber, said second input port being coupled to said additional dispersion compensating fiber, and said output port being configured to supply said first and second groups of said plurality of optical signals to a second optical communication path.

5. An optical communication apparatus in accordance with claim 1, wherein said at least one dispersion compensating fiber is a first dispersion compensating fiber having first nonlinearity coefficient values that increase with increasing wavelength, and a second dispersion compensating fiber having second nonlinearity coefficient values that decrease with wavelength.

6. An optical communication apparatus in accordance with claim 5, whereby a sum of said first and second nonlinearity coefficient values is substantially spectrally uniform.

7. An optical communication apparatus in accordance with claim 1, wherein said dispersion compensating element comprises:

an optical demultiplexer having an input port and a plurality of output ports, each of said plurality of output ports supplying a respective one of said plurality of optical signals;

a plurality of dispersion compensating fibers, each of which being coupled to a respective one of said plurality of outputs ports of said optical demultiplexers, each of said plurality of dispersion compensating fiber having a corresponding one of a plurality of lengths, such that each of said plurality of dispersion compensating fibers has substantially the same nonlinearity coefficient;

an optical multiplexer having a plurality of input ports and an output port, each of which being coupled to a corresponding one of said plurality of dispersion compensating fibers, said plurality of input ports of said optical multiplexer receiving said plurality of optical signals, and said output port of said optical multiplexer being configured to output said plurality of optical signals to an optical communication path.

8. An optical communication apparatus in accordance with claim 1, wherein said plurality of optical signals are transmitted at an OC-192 rate.

9. An optical communication apparatus in accordance with claim I further comprising an optical amplifier coupled to said optical communication path, said dispersion compensating element being provided within said optical amplifier.

10. An optical communication apparatus in accordance with claim 9, wherein said optical amplifier further comprises:

a first segment of optically amplifying fiber having a first end portion coupled to a first part of said optical communication path and a second end portion; and a second segment of optically amplifying fiber having a first end portion coupled to a second part of said optical communication path and a second end portion, said dispersion compensating element being coupled to said second end portion of said first segment of optically amplifying fiber and said second segment of said optically amplifying fiber.

11. An optical communication apparatus in accordance with claim 10, wherein said first and second segments of optically amplifying fiber comprise erbium-doped optical fiber.

12. An optical communication apparatus, comprising:

a plurality of optical transmitters, each of which emitting a respective one of a plurality of optical signals, each optical signal being at a respective one of a plurality of wavelengths, each of said plurality of optical transmitters being configured to be coupled to an optical communication path, whereby said plurality of optical signals are supplied to said optical communication path;

a dispersion compensating fiber configured to be coupled to said optical communication path, an optical power associated with each of said plurality of optical signals be adjusted so that said dispersion compensating fiber has a spectrally uniform nonlinearity; and a plurality of optical receivers configured to be coupled to said optical communication path, each of said plurality of optical receivers sensing a respective one of said plurality of optical signals.

* * * * *